US006851686B2

(12) United States Patent  (10) Patent No.: US 6,851,686 B2
Figueroa  (45) Date of Patent: Feb. 8, 2005

(54) WHEELED CART FOR PAILS

(76) Inventor: Michael A. Figueroa, 64 Ashland St., New Rochelle, NY (US) 10801

(*) Notice: Subject to any disclaimer, the term of this patent is extended or adjusted under 35 U.S.C. 154(b) by 6 days.

(21) Appl. No.: 10/337,123

(22) Filed: Jan. 6, 2003

(65) Prior Publication Data

US 2003/0102644 A1 Jun. 5, 2003

Related U.S. Application Data

(63) Continuation-in-part of application No. 29/144,841, filed on Jul. 11, 2001, now Pat. No. Des. 468,509.

(51) Int. Cl.[7] .............................................. B62B 1/00
(52) U.S. Cl. ................................................ 280/79.5
(58) Field of Search ........................ 280/79.4, 79.5, 280/79.6, 47.34, 47.35; 248/98, 129; D6/462; D34/12, 14, 17, 23, 25, 27

(56) References Cited

U.S. PATENT DOCUMENTS

| 931,849 | A | * | 8/1909 | Dickinson | 248/129 |
| 1,112,558 | A | * | 10/1914 | Red | 248/129 |
| D154,191 | S | * | 6/1949 | Smith | D7/306 |
| 2,596,749 | A | * | 5/1952 | Webber | 211/70.6 |
| D183,171 | S | * | 7/1958 | Krueger et al. | D6/462 |
| 3,162,462 | A | * | 12/1964 | Elders | 280/47.35 |
| D205,284 | S | * | 7/1966 | Bongiorno | D34/17 |
| D362,762 | S | * | 10/1995 | Emalfarb et al. | D6/405 |
| 5,704,496 | A | * | 1/1998 | Latta | 211/70.6 |
| D461,614 | S | * | 8/2002 | Liu | D34/23 |
| D483,579 | S | * | 12/2003 | Frankelton | D6/462 |
| 6,666,465 | B2 | * | 12/2003 | Chan | 280/47.26 |

* cited by examiner

*Primary Examiner*—Bryan Fischmann
(74) *Attorney, Agent, or Firm*—Abelman, Frayne & Schwab

(57) ABSTRACT

A cart has a base for securely receiving one or a plurality of stacked containers, such as drywall compound, paint or other dense material, allowing a user to work from an open container while the container is on the cart. A frame assembly, which can be used as a handle during operation, is secured to the base and a tool rack for receiving and removably securing at least one tool is mounted on the frame assembly.

13 Claims, 4 Drawing Sheets

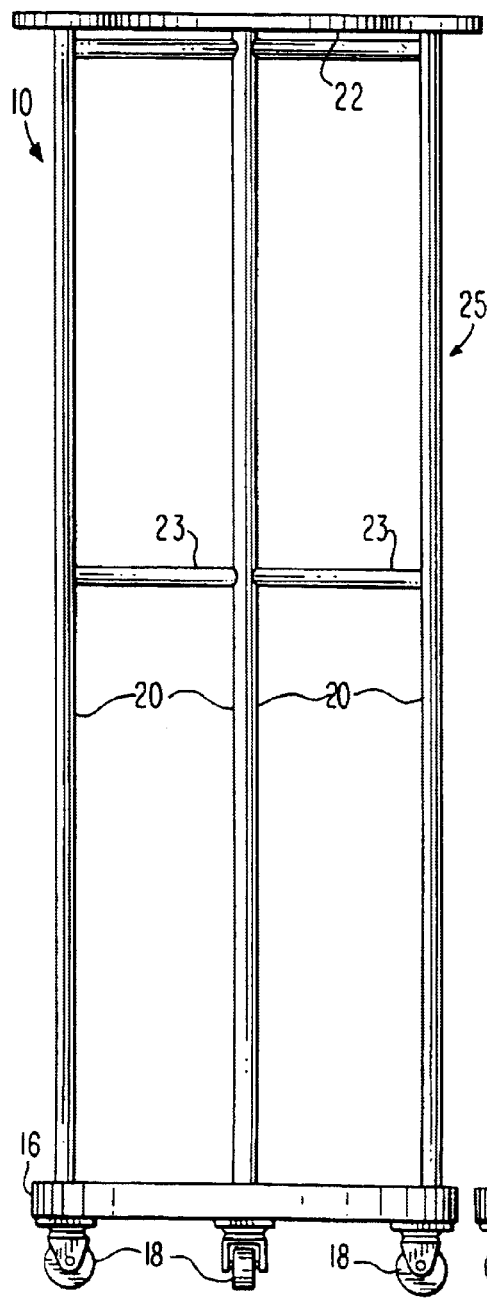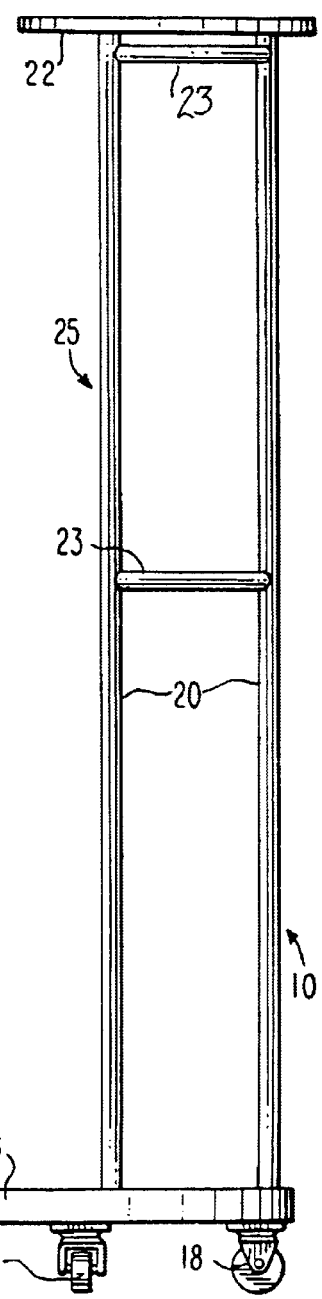

WHEELED CART FOR PAILS

CROSS-REFERENCE TO RELATED APPLICATIONS

This application is a continuation-in-part of U.S. Ser. No. 29/144,841, filed Jul. 11, 2001 now U.S. Pat. No. D, 468, 509, which is incorporated herein by reference.

FIELD OF THE INVENTION

This invention relates to carts, and in particular to wheeled carts for carrying pails, tools, and the like.

BACKGROUND OF THE INVENTION

Mobile devices such as handtrucks, carts and dollies are utilized to retain containers such as pails, tools, materials, and other items for use in connection with housework, construction, painting and electrical and/or mechanical repairs to a house, office, or other facilities.

Typical handtrucks having two wheels mounted on an axle with a rectangular surface are capable of receiving and retaining stacked items as the handtruck is moved about, for example, from a storage or unloading site to a work location. A handtruck can be used to transport a stack of five-gallon pails containing drywall compound, paint, liquid asphalt or other dense materials. However, such pails typically rest on and overhang the base of the handtruck in an insecure and unstable configuration when the truck is in an upright stopped position.

Dollies or wheeled carts with larger rectangular surfaces can receive boxes or pails positioned in a side-by-side relation. However, such configurations of boxes or pails typically require a large surface area, and this type of cart is not readily stored or moved about through close quarters. That is, the cart covers a large area, and so is not suited for storage in small closets when not in use.

Furthermore, handtrucks and carts known in the art are not readily adapted for retaining smaller tools and other hand-held items for ease of use. In the case of carts with large rectangular retaining baskets, the tools must be placed in the basket with other tools and/or boxes or pails. Accordingly, a user can be inconvenienced by the necessity of locating a desired tool from among the contents of the basket.

It is therefore an object of the present invention to provide a cart having a relatively small load-receiving area, or "foot print", for ease of storage and that is capable of retaining hand-held tools so that they can be readily retrieved when needed.

A further object of the invention is to provide a cart having a compact construction which is only slightly larger than the diameter or base area of containers which it is adapted to receive and move about, and which is stable when at rest even with two or more containers stacked one upon the other.

BRIEF SUMMARY OF THE INVENTION

The above objects and other advantages are achieved by the cart of the invention that has a base that is configured to have a receiving area that is only slightly larger than the bottom and maximum peripheral surface of the container to be placed on the base. The base of the cart is adapted to securely receive and hold the container, allowing a user to work from an open container while the container is still on the cart, even if the open container is stacked on one or more other such containers. With containers in such a stacked configuration on the base, the cart allows the user to easily transport the stacked containers, including heavy containers such as five-gallon pails of drywall joint compound and paint, from one work area to another.

The base of the cart is provided with a plurality of wheels to insure the stability of the maximum load during movement. In one preferred embodiment the cart is fitted with at least four caster wheels.

The cart includes a frame assembly having at least one post and at least one crossmember that is securely mounted to the base, which frame assembly is capable of functioning as a handle which can also serve to steady stacked containers over uneven surfaces. In a particularly preferred embodiment a tool rack is formed in, or mounted on the at least one post for receiving and removably retaining at least one tool for easy access during work.

BRIEF DESCRIPTION OF THE DRAWINGS

Preferred embodiments of the invention are described hereinbelow with reference to the drawings wherein:

FIG. 3 is a front elevational view thereof;

FIG. 4 is a right side elevational view thereof, the left side being a mirror image;

DETAILED DESCRIPTION OF THE INVENTION

Referring to FIGS. 1–6, a cart 10 in accordance with one preferred embodiment of the present invention is adapted to receive and securely hold one or more containers 12, 14, allowing a user to work from an open container while the container is stacked on the cart 10.

Figure 6:
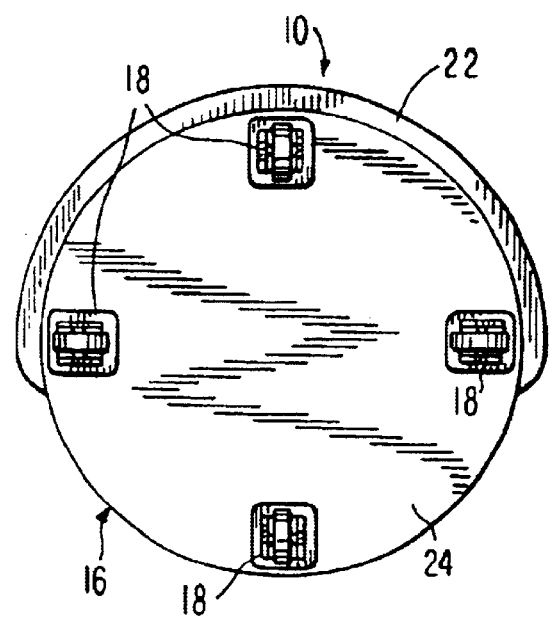
FIG. 6 is a bottom view thereof.

In this embodiment, the cart 10 includes a round base 16, a plurality of wheels 18, a handle comprised of a plurality of posts 20, and a tool rack 22. The wheels 18 are mounted to the base 16, for example, on an underside 24 of the base 16, to permit the user to move the cart 10 along a surface such as a floor or ramp. As best shown in FIG. 6, four caster wheels 18 are mounted in an equidistant configuration around the periphery of the base 16 and provide stability to the wheeled cart 16 when stationary and when in motion.

Figure 5:
FIG. 5 is a rear elevational view thereof.

As shown in FIGS. 3–5, the posts 20 and crossmembers 23 of the frame assembly 25 form an open cage configuration to easily permit placement of the containers 12, 14 from one side and to retain the containers as the cart 10 is moved about in the vertical orientation shown in FIGS. 1, 3–5, and 7, or even in a tilted orientation where the frame assembly 25 can support the containers when stacked. The posts can also serve to receive elastic cords or the like for further securing the stacked containers.

Additional reinforcement can be achieved by providing one or more horizontal cross members 23 extending between posts 20 at one or more vertical locations above base. The cross members 23 and tool rack 22 can be conveniently and rigidly joined to posts 20 by welding or by using mechanical fasteners that are well known in the art. Similar methods can be utilized to secure the posts 20 of the frame assembly to the base 16.

As will be apparent to one of ordinary skill in the art, other configurations of the frame assembly can be utilized, including a single post 20 with extending angular supporting arms (not shown) affixed to the base and to the tool rack. The upper end of the frame assembly can project at a right angle to the vertical and be provided with a cushion grip in a manner commonly used with handtrucks of the prior art. The tool rack 22 is mounted on the at least one post 20 of the frame assembly 25 and is positioned at any convenient, predetermined level above the base 16. For example, each post 20 is positioned in mounting holes 26 in the tool rack 22 to provide a secure mounting. The tool rack 22 includes at least one, but preferably a plurality of apertures 28 for removably retaining at least one tool 30, such as a paintbrush, a trowel, or other drywall tool.

In the first preferred embodiment illustrated, the base 16 has a first diameter somewhat greater than the diameter of the container 12 that is to be positioned on the base 16. In a preferred embodiment, the first diameter is slightly larger than the container's diameter, with a space 32 between the container 12 and the side 34 of the base 16 thereby allowing the posts 20 to be positioned proximate the container 12 and the other containers 14 to be stacked on the bottom container 12.

Figure 1:
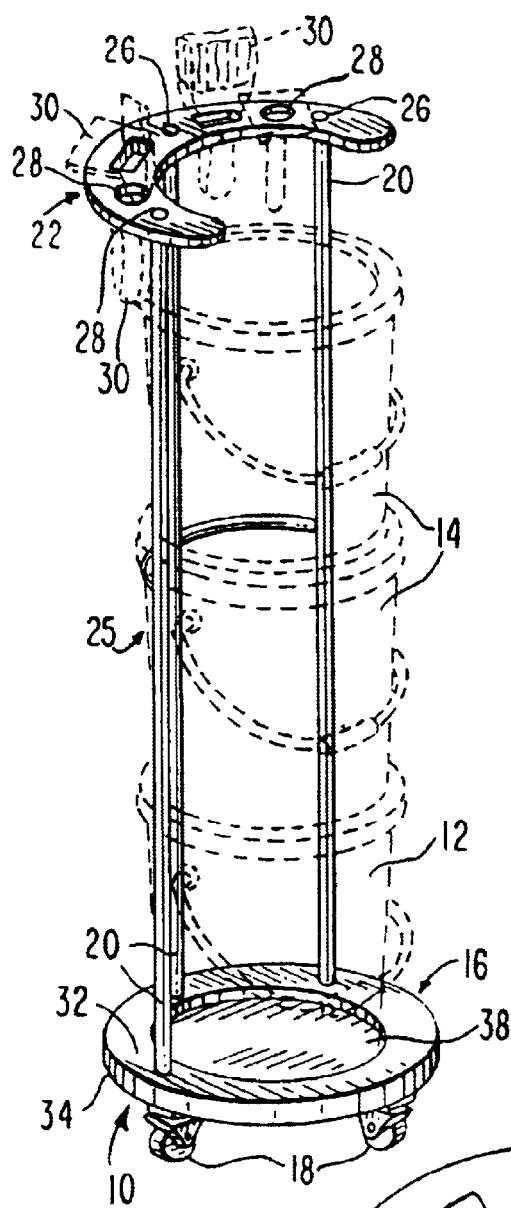
FIG. 1 is a top, front perspective view of a wheeled cart in accordance with the present invention.
Figure 2:
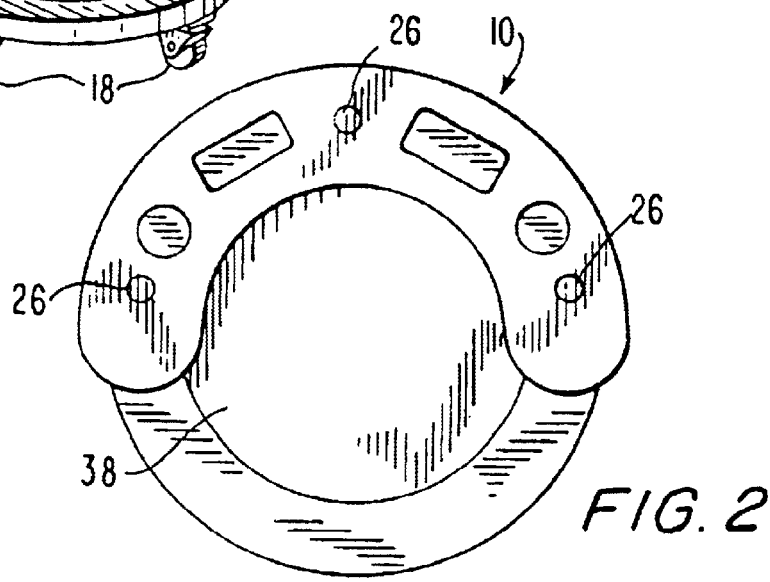
FIG. 2 is a top plan view thereof.
Figure 7:
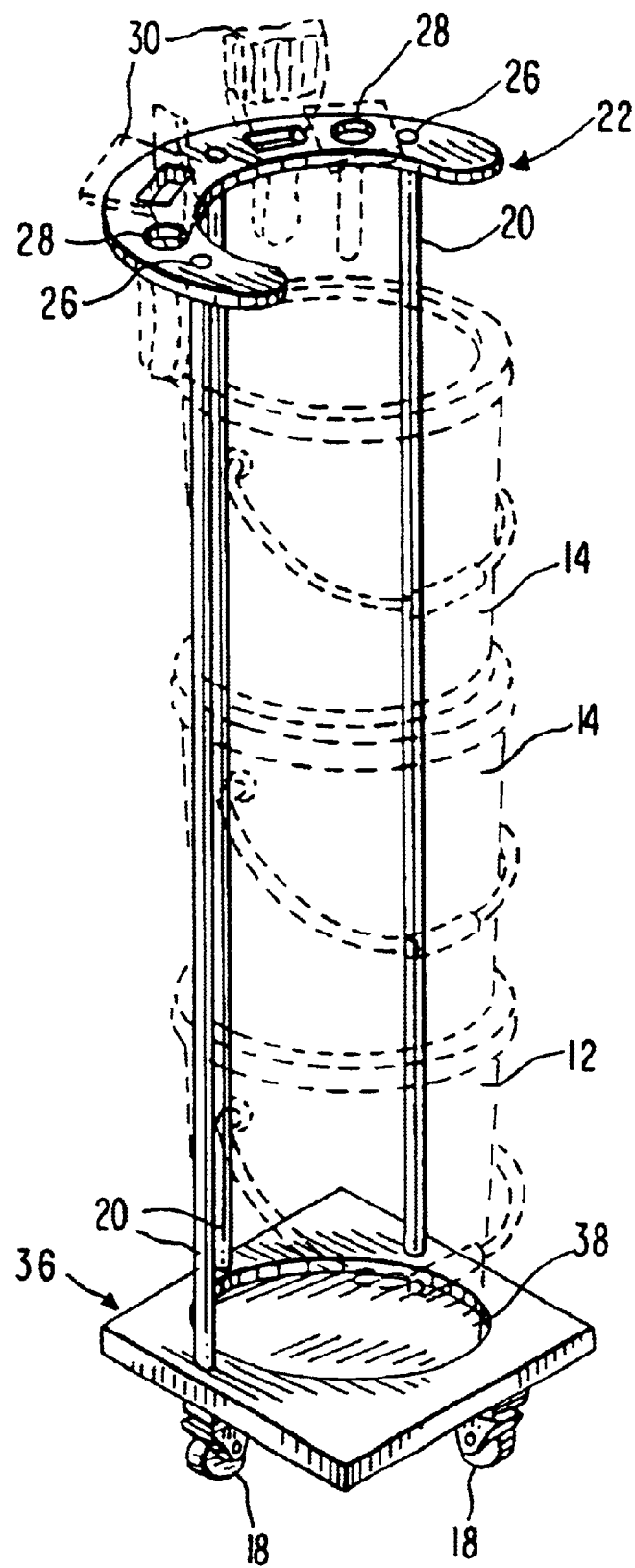
FIG. 7 is top, front perspective view of an alternative embodiment of the wheeled cart of FIG. 1.

The base 16 can be generally circular, as shown in FIGS. 1–6. Alternatively, as shown in the alternative embodiment of FIG. 7, the base 36 can be rectangular, or have rounded corners. In either embodiment, the lowermost container 12 is positioned on a central portion or area of the base 16, 36, as shown in FIGS. 1 and 7, respectively.

In a preferred embodiment, a depression 38 can be centrally disposed in an upper surface of the base 16, 36 for receiving therein the bottom of a container 12. The depression 38 can be circular or polygonal and formed below the upper surface of the base plate, or formed as an upstanding rim or collar, and of a diameter that is sufficient to receive a container 12 having a circular cross-section in stabilizing relation.

The diameter or periphery of the depression 38 can be slightly larger than the diameter of the containers 12, 14. For example, for a standard sized cylindrical container such as drywall pail or paint can, the depression 38 can be dimensioned to provide a snug fit to the container 12 sitting therein. Accordingly, the depression 38 provides greater stability to the container 12 and the overall stack of containers 12, 14 as the cart 10 is transported.

Alternatively, the depression 38 can be of any shape to receive and hold a complimentary shape, such as a square depression for holding a square base of a rectilinear container.

In order to move the cart, the user can grasp a cross member 23 of the frame assembly, the tool rack 22 and/or one of the posts 20 for pushing and/or pulling the cart 10 on the wheels 18 across the surface. Alternatively, by grasping the cross member 23, the tool rack 22 and/or the posts 20, the user can tilt the cart 10 back on a pair of wheels 18, at any desired angle in the manner of a handtruck, with the containers 12, 14 and/or the tools 30 retained on the cart 10 by supporting posts 20, while moving the cart down steps or a steep ramp.

As will be apparent to one of ordinary skill in the art, various changes in structural details and assembly can be made to the construction of the cart without departing from the novel features of the invention, the scope of which is defined by the claims that follow.

I claim:

1. A cart for transporting one or more containers having a predetermined bottom configuration, the cart comprising:
    a planar base having
        an upper supporting surface with a downward depression therein having an exposed container supporting surface corresponding to the shape of the predetermined bottom configuration of a first container for securely and removably receiving the first container positioned on the base in the downward depression; and
        an underside to which are mounted a plurality of wheels to thereby permit the cart to be stably moved over a surface of a path of travel;
    a frame assembly extending upwardly from the upper supporting surface of the base which can be grasped and used as a handle, the frame assembly including:
        at least one post mounted to an exposed upper side of the upper supporting surface of the base; and
    a tool rack joined to the frame assembly for removably retaining at least one tool therein.

2. The cart of claim 1, wherein the depression is circular.

3. The cart of claim 1, wherein the base is circular.

4. The cart of claim 1, wherein the base is rectangular.

5. The cart of claim 1, wherein the tool rack is mounted proximate the upper end of the at least one post.

6. The cart of claim 5, wherein the container supporting surface is centrally positioned on the base and the at least one post extends upwardly proximate at least one side of the first container.

7. The cart of claim 1, wherein the tool rack has a plurality of apertures for removably retaining tools.

8. A cart for transporting one or more containers having a predetermined bottom configuration, the cart comprising:
    a plurality of supporting wheels;
    a generally circular planer base having;
        a diameter greater than the maximum diameter of a container to be positioned on the base;
        an upper supporting surface with a downward depression therein having an exposed container supporting surface corresponding to the shape of the predetermined bottom configuration of a first container for removably receiving the first container positioned on the base in the downward depression; and
        an underside to which are mounted the plurality of supporting wheels to thereby permit the cart to be moved over a travel surface;
    a frame assembly secured to and extending upward from the upper supporting surface of the base which frame can be grasped and used as a handle, the frame assembly including:
        at least one post mounted to an exposed upper side of the upper supporting surface of the base; and
    a tool rack joined to the frame assembly for removably retaining at least one tool therein.

9. The cart of claim 8, wherein the depression is circular.

10. The cart of claim 8, wherein the base is fabricated from a material selected from the group consisting of plastic, metal and wood.

11. The cart of claim 10, wherein the base is molded plastic.

12. A mobile cart for transporting one or more generally cylindrical stackable containers, the cart comprising:
    at least four wheels;
    a planar base having
        a diameter that is greater than the maximum diameter of the one or more containers to be received on the base;

an upper supporting surface with a downward recess therein having an exposed container supporting surface corresponding to the shape of a predetermined bottom configuration of a first container for securely and removably receiving the first container positioned on the base in the downward recess; and an underside to which are mounted the at least four wheels to thereby permit the cart to be moved over a travel surface;

a frame assembly comprising at least three posts extending upwardly from an exposed upper side of the upper supporting surface of the base which is positioned for use as a handle, with the at least three posts in spaced apart relation to permit the one or more containers to be stacked on the base; and a tool rack mounted on the frame assembly having at least one aperture for removably retaining at least one tool therein.

13. The cart of claim 12, wherein the recess is circular.

* * * * *